United States Patent [19]

Lammertz et al.

[11] Patent Number: 4,943,394

[45] Date of Patent: Jul. 24, 1990

[54] METHOD OF STORING RADIOACTIVE WASTE WITHOUT RISK OF HYDROGEN ESCAPE

[75] Inventors: Herbert Lammertz, Jülich; Kornelius Kroth, Linnich, both of Fed. Rep. of Germany

[73] Assignee: Kernforschungsanlage Jülich Gesellschaft mit beschränkter Haftung, Jülich, Fed. Rep. of Germany

[21] Appl. No.: 301,435

[22] Filed: Jan. 25, 1989

[30] Foreign Application Priority Data

Jan. 30, 1988 [DE] Fed. Rep. of Germany ....... 3802755
Nov. 23, 1988 [EP] European Pat. Off. ........ 88119450.0

[51] Int. Cl.[5] .......................... G21F 9/16; G21F 9/02; C01B 1/26; C01B 6/04

[52] U.S. Cl. .................................... 252/628; 106/638; 252/630; 252/633; 252/629; 376/418; 376/902; 423/248; 423/647.7; 427/6

[58] Field of Search ....................... 252/628, 633, 630; 106/89, 102, 97, 101; 376/418, 902; 423/248, 647.7

[56] References Cited

U.S. PATENT DOCUMENTS

| | | | |
|---|---|---|---|
| 4,049,545 | 9/1977 | Horvath | 210/726 |
| 4,056,937 | 11/1977 | Suzuki | 106/74 |
| 4,119,560 | 10/1978 | Sheeline | 252/628 |
| 4,141,744 | 2/1979 | Prior et al. | 106/105 |
| 4,340,499 | 7/1982 | Fischer | 252/628 |
| 4,476,048 | 10/1984 | Ambros et al. | 252/632 |

FOREIGN PATENT DOCUMENTS

| | | | |
|---|---|---|---|
| 2910034 | 9/1980 | Fed. Rep. of Germany . | |
| 2490865 | 9/1980 | France . | |
| 0172299 | 10/1982 | Japan | 252/631 |
| 0000047 | 1/1980 | World Int. Prop. O. | 252/628 |

*Primary Examiner*—Howard J. Locker
*Attorney, Agent, or Firm*—Frishauf, Holtz, Goodman & Woodward

[57] ABSTRACT

In order to prevent the formation of a hydrogen atmosphere in a free gas space usually available in the storage containers of radioactive waste, potassium permanganate is dispersed in a suitable carrier within the storage barrel provided for the waste. When the radioactive waste is first encased in cement before being put in a storage barrel, the potassium permanganate is introduced into the cement before it sets by mixing in a solution or crystals. Alternatively the compressed or solidified waste is enveloped in a porous non-reducing aggregate of carrier materials, such as particles of aluminum oxide, on the exposed surfaces of which potassium permanganate is applied or which is mixed with potassium per manganate particles. The waste and the enveloping permanganate-containing carrier material are then securely enclosed in a common container.

11 Claims, No Drawings

METHOD OF STORING RADIOACTIVE WASTE WITHOUT RISK OF HYDROGEN ESCAPE

This invention concerns a method of storing radioactive waste material in which the waste material is solidified or pressed and then enclosed or sealed in a container.

Radioactive waste either fixed in a solid body or pressed, is securely enclosed in containers for storage in order to prevent radioactive contamination of the environment. Experience with such storage has shown that hydrogen is generated in the waste material by chemical and radiolytic reactions. This evolution of hydrogen is undesired and inconsistent with final storage objectives.

Radioactive waste, for example such as results from the reprocessing of fuel elements, including structural parts, zircaloy enclosing tubes and insoluble residues from fuel solution (feed sludge) are cast in cement for final storage in containers. The waste and cement mixture in such cases is usually poured into insert or liner drums of 140 l. capacity which are then introduced into 200 liter barrels. After the setting of the cement the liner drums are inserted in 200 liter barrels and are securely closed with covers and with the interposition of rubber seals.

It has been found that the water contained in the cement matrix is decomposed into hydrogen and oxygen by radiolysis. The oxygen reacts with the materials of the waste aggregate and is therefore not usually found in the vacant space of the 200 liter barrels, which in each case includes about 70 liters of free gas volume.

The hydrogen produced by radiolysis, on the contrary, remains in the gas space. According to the activity content of a barrel, a volume of hydrogen of an order of magnitude of 1 cubic meter can be formed in the course of the first decade of storage, which as already noted is undesired and contrary to final storage principles.

SUMMARY OF THE INVENTION

It is an object of the present invention to improve storage methods for radioactive waste in such a way that the formation of a hydrogen atmosphere in the free gas volume in the outer container will be prevented.

Briefly, a content of potassium permanganate is introduced into a non-reducing packing and enveloping material for the waste material, whether the packing and enveloping material is cement or some other concrete forming material or a granular or pulverized aluminum oxide, grog, fire-clay or other ceramic material used as an enveloping aggregate for the waste. In the case of cement the permanganate is introduced as a solution or as solid particles and dispersed before the cement sets. In the case of a ceramic particle carrier material for the permanganate, the permanganate can be introduced as an aqueous solution, after which the particles wetted with the solution are dried before they are used, or it may be introduced as solid particles mixed with the carrier particles in which the solidified or pressed radioactive waste is enveloped for being securely enclosed in a container that encloses both the carrier material and the waste. As the result of the permanganate content, the hydrogen, independently of its source and generation, is combined in the material in which the radioactive waste is enveloped.

When the potassium permanganate is put into cement for encasing radioactive waste before the cement is set, the hydrogen formed by radiolysis is still oxidized to form water.

For homogenous distribution of the potassium permanganate the use of a water solution of the permanganate is convenient and effective, but it is also practical to stir potassium permanganate as solid particles into the cement before it is set or to mix as solid particles with ceramic carrier material particles.

Aluminum oxide, grog and fire-clay (chamotte) have been found particularly suitable as carrier material for mixing or coating with potassium permanganate.

Since the oxidizing agent (permanganate) that is provided is used up in the reaction with hydrogen, it is necessary to provide a sufficient quantity of oxidizing agent in order to convert all the hydrogen situated during the duration of storage. The quantity of oxidizing agent, on the other hand, in the case that it is provided as an additive to cement, should not lead to a weakening of the cement. Potassium permanganate has been found particularly suitable as the oxidizing agent for the hydrogen generated in radioactive waste encased in cement.

10g to 100g of potassium permanganate is preferably provided for every liter of cement block, concrete or carrier material aggregate for assuring oxidation of all the hydrogen that may be produced during final storage. If the cement is mixed with a saturated solution of potassium permanganate, that produces a proportion of about 35g of $KMnO_4$ per liter of cement block. For packing and enveloping material which is filled into the annular space usually left available in a 200 liter barrel more potassium permanganate can be provided in the aggregate (up to 100 grams per liter of carrier aggregate). When aluminum oxide is used as the carrier material for the envelopment aggregate about 15 to 30 grams of potassium permanganate per kilogram of aluminum oxide should be applied to or mixed into the aluminum oxide. In the case of homogenous mixing of aluminum oxide and solid potassium permanganate, 100 grams of permanganate per liter of carrier material an evidently appropriate provision of this oxidizing agent.

EXAMPLES OF DETAILED DESCRIPTION

The invention is further described by reference to four illustrative experimental examples.

Example 1

Tests on measured samples of cement block and $Al_2O_3$.

The hydrogen consumption capability of potassium permanganate was investigated by parallel tests on two samples of the same composition, one of which was irradiated and the other of which was not irradiated, for comparison. For this purpose two samples of cement block bodies and two samples of $Al_2O_3$ (both treated for addition of potassium permanganate) were prepared.

The cement block samples and the samples of $Al_2O_3$ were sealed gas tight for the experiment in 1.65 liter barrels which were evacuated and then subjected to a gas mixture consisting of 20% of hydrogen and 80% krypton.

In the making of the cement block bodies (samples 1 and 2; Portland cement 35; pH 12.5) there was added to the 1270g of the cement powder of 575g of water and 15g of $KMnO_4$ (=0.095 mol of $KMnO_4$). The mass of sample 1 was 1755g and that of sample 2 1765g.

For samples 3 and 4, $Al_2O_3$ powder was treated with potassium permanganate solution and the treated powder was then vacuum dried. The respective masses of samples 3 and 4 were each 1 kg.

One of each of the pairs of parallel samples were irradiated for five days to a radiation dose of 1.5 to $2.5\times10^6$ rad. The other two parallel samples were kept in the laboratory at room temperature without irradiation.

Thereafter measurements and gas sample taking were carried out, followed by an analysis of the sampled gas for all samples. The results appear in the accompanying table.

If there is postulated a $G_{H2}$ value for radiolytic generation of hydrogen of 0.45 $\mu$Mol/g $H_2O\times$Mrad (0.45 ml $H_2/10^8$ rad g cement block), a hydrogen volume of 10 to 20 ml could be produced as the result of the radiation in the cement block samples. In contrast thereto the hydrogen content of the initial gas filling in the gas of the cement block samples was about 180 ml $H_2$.

The two cement block samples (samples 1 and 2) used up during the experiment time the original hydrogen volume and also the additionally evolved hydrogen freed by radiation was practically completely used up. Presumably there occurs at the same time a certain amount of evolution of $O_2$ which splits off from the $KMnO_4$, and this splitting off of $O_2$ is stimulated in the irradiated sample.

In the $Al_2O_3$ powder samples the previously supplied hydrogen was likewise completely used up.

On the basis that $KMnO_4$ in its reaction with hydrogen converts $Mn^{7+}$to $Mn^{4+}$, 3/2 O was given off per KMNo4 molecule. 15g of $KMnO_4$ accordingly correspond to 1.6 normal liters of $O_2$ or 3.2 normal liters of $H_2$. In the samples, however, only a maximum of 0.2 normal liter (nl) $H_2$ was converted.

again closed gas tight and was flushed out with synthetic air for the next measurement phase.

In the case of the second measurement container, in which no potassium permanganate was added, an approximately constant pressure of about 100 mbar was observed over a standing time of about 100 days. Thereafter the pressure rose at a constant rate (observation time altogether 120 days). This course of pressure depends upon the fact that in the beginning phase the oxygen loss rate and the hydrogen production rate from radiolysis approximately compensate each other. Thereafter the pressure increases linearly as soon as the oxygen of the air is practically completely used up.

After the addition of the permanganate containing $Al_2O_3$ absorption shell, the internal pressure in the first measurement container fell continously for 120 days from about 1000 mbar to about 860 mbar. Furthermore, gas samples were taken after 56 days and after 120 days. The analyses showed for the first sample 0.4% $H_2$ 7.2% $O_2$, 89.5% $N_2$ and 0.5% $CH_4$, and for the second sample 2.5% $H_2$, 1.0% $O_2$, 91.4%N2 and 1.2% $CH_4$. The increased hydrogen content at the end of the standing time is due to the fact that the potassium permanganate was nearly exhausted.

If it is assumed that in the conversion of $H_2$ the $KMnO_4$ changes its valence from $Mn^{7+}$to $Mn^{4+}$, 40g of $KMnO_4$ deliver stoichiometrically a hydrogen conversion capacity of 8.6 normal liters of hydrogen. If then there is taken into consideration that during the measurement period in which the oxidizing agent is present in the measurement container the hydrogen evolution rate continued at 77 Nml $H_2$ per day, the potassium permanganate would accordingly have converted a hydrogen volume of about 10.0 normal liters.

TABLE OF RESULTS OF EXAMPLE 1 TESTS

| Sample No. | Content | Gas Filling | Filling Pressure | Final Pressure | Concentration in % $H_2$ | Concentration in % $O_2$ | Dose rad |
|---|---|---|---|---|---|---|---|
| 1 | PC-35 $p_H$ 12.5 | 20% $H_2$; 80% Kr | 1450 | 1154 | $\leq$0.1 | 0.7 | unirradiated |
| 2 | PC-35 $p_H$ 12.5 | 20% $H_2$; 80% Kr | 1451 | 1193 | $\leq$0.1 | 4.5 | ca. 2 $10^6$ |
| 3 | $Al_2O_3$-powder | 20% $H_2$; 80% Kr | 1450 | 1064 | $\leq$0.1 | 0.9 | unirradiated |
| 4 | $Al_2O_3$-powder | 20% $H_2$; 80% Kr | 1447 | 1152 | $\leq$0.1 | 2.4 | 2.5 $10^6$ |

Example 2

Investigation of insert drum with radioactive waste

For this investigation insert drums (140 1) containing cemented radioactive structural parts, fuel element shells and feed sludge were taken out of the larger containers (200 liter barrels) and securely enclosed in measurement containers prepared particularly for the present purpose. The empty space in the measurement containers was about 47 liters. The radiolytic evolution of hydrogen from the cemented waste was reported by observation of the internal pressure in the container and by taking gas samples followed by gas-chromatographic analysis of the gas components.

In the case of the first measurement container the evolution of hydrogen was first observed over an interval of 300 days and an average evolution rate of about 77 ml of hydrogen per day was calculated. The measurement container was then opened and was provided with an absorption shell of about 2.5 kg $Al_2O_3$ which had been impregnated with about 40 g of $KMnO_4$ in the manner described in example 1. After this absorption shell had been added, the measurement container was The balance of this chemical reaction shows that the added oxidizing agent was practically completely used up for the conversion of the radiolytically produced hydrogen.

EXAMPLE 3

A freshly mixed cement sample of about 1 liter with a water to cement ratio of 0.43 was supplied with an addition of 100g $KMnO_4$ in crystalline form which was then uniformly mixed into the cement before setting The solid cylindrical sample was taken out of its mold after 24 hours and was inserted in a gas-tight vessel and held for 32 days under a hydrogen partial pressure of 500 to 600 mbar. During this period the containing vessel stood in a thermostatic chamber held at 50° C.

After the lapse of the above-mentioned time, the sample was removed, broken up and investigated for potassium permanganate. Only $MnO_2$ appeared in the sample: the $KMnO_4$ had been completely converted.

EXAMPLE 4

A minimum moistness is necessary for the conversion of hydrogen by potassium permanganate crystals. For this reason a moist cement block cylinder of a volume of about 1 liter was surrounded with 600 ml $Al_2O_3$ powder which contained 60g of $KMnO_4$ in crystal form. The cement block cylinder and the surrounding aggregate were enclosed gas-tight and were held for 8 days at 50° C. under 500 to 600 mbar partial pressure of hydrogen.

Thereafter $KMnO_4$ was found completely converted to $MnO_2$.

Although the invention has been described with reference to particular experimental facts and examples, it would be understood that variations and modifications are possible within the inventive concept.

We claim:

1. Method of storing radioactive waste material in which waste material is solidified or pressed and then sealed in a container, comprising the steps of:

introducing a content of potassium permanganate into a nonreducing packing and enveloping material for said waste material, said packing and enveloping material being composed of at least one material which is a member of the group consisting of cement and other concrete-forming materials and granular and pulverized aluminum oxide, grog, fire-clay and other ceramics, and thereby producing a permanganate-containing packing and enveloping material in which potassium permanganate is dispersed for eliminating hydrogen generated by said waste material during storage, and enveloping said radioactive waste material in a mass of said permanganate-containing packing and enveloping material within a common long-term storage container.

2. Method according to claim 1, wherein said content of potassium permanganate is introduced into and dispersed in cement prior to the setting of the cement and then the resulting permanganate-containing cement is used for solidifying said radioactive waste material for storage by casting it in cement therewith, and thereafter enclosing the resulting cement-encased waste material in said storage container.

3. Method according to claim 2, wherein said potassium permanganate is introduced into said cement as an aqueous solution.

4. Method according to claim 2, wherein said potassium permanganate is introduced into said cement as particles of solid potassium permanganate.

5. Method according to claim 1, wherein said content of potassium permanganate is introduced in the form of an aqueous solution into a porous carrier material of ceramic particles, after which said carrier material is dried and thereafter the dried carrier material having a content of potassium permanganate is used to envelop a mass of said radioactive waste material in a common outer container.

6. Method according to claim 1, wherein said content of potassium permanganate is introduced into a porous mass of ceramic particles mixed therewith, after which the resulting permanganate-containing packing and enveloping material is used to envelop said radioactive waste in an outer long-term storage container.

7. Method according to claim 5, wherein said carrier material consists essentially of $Al_2O_3$.

8. Method according to claim 6, wherein said carrier material consists essentially of $Al_2O_3$.

9. Method according to claim 1, wherein the relative quantity of potassium permanganate introduced into said cement is such that between 10g and 100g potassium permanganate is contained per liter of resulting cement block or concrete.

10. Method according to claim 5, wherein the relative quantity of potassium permanganate introduced into said carrier material is between 10 g and 100 g per liter of said carrier material as packed to envelop said waste material.

11. Method according to claim 2, wherein the relative quantity of potassium permanganate introduced into said cement is such that between 10g and 100g potassium permanganate is contained per liter in the resulting cement block or concrete.

* * * * *